United States Patent
Chang

(10) Patent No.: US 10,488,900 B2
(45) Date of Patent: Nov. 26, 2019

(54) HEAT DISSIPATION CONTROL METHOD FOR OPERATION RESOURCES, OPERATION CONTROL SYSTEM, AND STORAGE MEDIUM

(71) Applicant: ONEPLUS TECHNOLOGY (SHENZHEN) CO., LTD., Shenzhen (CN)

(72) Inventor: Wenyen Chang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 153 days.

(21) Appl. No.: 15/747,508

(22) PCT Filed: Jun. 24, 2016

(86) PCT No.: PCT/CN2016/087145
§ 371 (c)(1),
(2) Date: Jan. 25, 2018

(87) PCT Pub. No.: WO2017/016357
PCT Pub. Date: Feb. 2, 2017

(65) Prior Publication Data
US 2018/0217645 A1   Aug. 2, 2018

(30) Foreign Application Priority Data

Jul. 28, 2015   (CN) .......................... 2015 1 0452697

(51) Int. Cl.
*G06F 1/00* (2006.01)
*G06F 1/20* (2006.01)
(Continued)

(52) U.S. Cl.
CPC ............ *G06F 1/206* (2013.01); *G06F 9/5027* (2013.01); *G06F 9/5094* (2013.01); *G06F 1/3287* (2013.01); *Y02D 10/22* (2018.01)

(58) Field of Classification Search
CPC ....................................................... G06F 1/206
See application file for complete search history.

(56) References Cited

U.S. PATENT DOCUMENTS

| 6,367,023 B2 | 4/2002 | Kling |
| 6,823,240 B2 | 11/2004 | Cooper |

(Continued)

FOREIGN PATENT DOCUMENTS

| CN | 1344389 A | 4/2002 |
| CN | 1602460 A | 3/2005 |

(Continued)

OTHER PUBLICATIONS

Supplementary European Search Report in European application No. 16829723.2, dated Jun. 29, 2018.

(Continued)

*Primary Examiner* — Mohammed H Rehman
(74) *Attorney, Agent, or Firm* — Syncoda LLC; Feng Ma

(57) ABSTRACT

A heat dissipation control method for operation resources, an operation control system, and a storage medium include: a resource monitoring module configured to determine, based on pre-set conditions, whether operation resources need to be opened or closed; and a heat dissipation management module configured to determine, based on a spatial position layout of each operation resource under a current running state according to a distance between each operation resource in closed operation resources and opened operation resources if opened, operation resources to be opened, and open the operation resources that need be opened. The heat dissipation management module is further configured to (Continued)

determine, based on the spatial position layout of each operation resource under the current running state according to a distance between the opened operation resources if closed, operation resources to be closed, and close the operation resources that need to be closed.

20 Claims, 7 Drawing Sheets

(51) Int. Cl.
*G06F 9/50* (2006.01)
*G06F 1/3287* (2019.01)

(56) References Cited

U.S. PATENT DOCUMENTS

| | | | |
|---|---|---|---|
| 7,054,720 | B2 | 5/2006 | Cooper |
| 7,441,135 | B1 | 10/2008 | Chan |
| 9,128,704 | B2 | 9/2015 | Kato |
| 9,389,664 | B2 | 7/2016 | Kato et al. |
| 2001/0003207 | A1 | 6/2001 | Kling |
| 2002/0013813 | A1* | 1/2002 | Matsuoka ........... H04L 12/1813 709/204 |
| 2003/0109967 | A1 | 6/2003 | Cooper |
| 2004/0268174 | A1 | 12/2004 | Cooper |
| 2009/0183016 | A1 | 7/2009 | Chan |
| 2009/0259345 | A1 | 10/2009 | Kato |
| 2011/0021207 | A1* | 1/2011 | Morgan ................... G01S 5/02 455/456.1 |
| 2013/0138796 | A1* | 5/2013 | Nicholson ............... H04L 67/16 709/224 |
| 2014/0057675 | A1* | 2/2014 | Meyers ............. H04M 1/72594 455/556.1 |
| 2014/0089700 | A1 | 3/2014 | Chang et al. |
| 2015/0106640 | A1 | 4/2015 | Brackman et al. |
| 2015/0153801 | A1 | 6/2015 | Bourdelles et al. |
| 2015/0237302 | A1* | 8/2015 | Cox ......................... H04N 7/15 348/14.08 |
| 2015/0260580 | A1* | 9/2015 | Alameh ................... G01J 5/027 250/339.02 |
| 2015/0378414 | A1 | 12/2015 | Kato et al. |

FOREIGN PATENT DOCUMENTS

| | | |
|---|---|---|
| CN | 101556493 A | 10/2009 |
| CN | 103370671 A | 10/2013 |
| CN | 103823716 A | 5/2014 |
| CN | 104360893 A | 2/2015 |
| CN | 104731740 A | 6/2015 |
| CN | 105045668 A | 11/2015 |
| EP | 2587339 A2 | 5/2013 |
| EP | 2881839 A1 | 6/2015 |

OTHER PUBLICATIONS

English Translation of International Search Report in international application No. PCT/CN2016/087145, dated Sep. 23, 2016.
English Translation of the Written Opinion of the International Search Authority in international application No. PCT/CN2016/087145, dated Sep. 23, 2016.

* cited by examiner

HEAT DISSIPATION CONTROL METHOD FOR OPERATION RESOURCES, OPERATION CONTROL SYSTEM, AND STORAGE MEDIUM

TECHNICAL FIELD

The disclosure relates to the technical field of mobile terminals, and particularly to a method for controlling heat dissipation of a computation resource, a system for controlling computation and a storage medium.

BACKGROUND

With continuous development of a technology, an area of a processing chip gets smaller and smaller, but more and more computation resources are placed on it. Because a high-density design may cause heating of computation resources together with other computation resources after starting, such interaction influence makes it difficult to dissipate heat to cause a rise of an overall temperature. Thermal interaction influence of various computation resources gets more serious and makes it more difficult to dissipate the heat.

For a processor applied to an intelligent mobile terminal (for example, a mobile phone and a tablet computer), such a heating problem is more highlighted. This is because, under a limit of a size, the intelligent mobile terminal may only adopt a passive heat dissipation manner and may not adopt a device such as a fan for active heat dissipation. A Central Processing Unit (CPU) of an existing processor for an intelligent mobile terminal includes multiple cores, a typical method in case of relatively high temperatures of the cores is to reduce operating frequencies of the cores, but performance of the processor may be influenced when reduction amplitudes of the operating frequencies of the cores are relatively high.

SUMMARY

In view of this, for solving the problem of thermal interaction influence brought by high-density integration of various computation resources, embodiments of the disclosure provide a method for controlling heat dissipation of a computation resource, a system for controlling computation and a storage medium, which may effectively reduce a temperature of a system for controlling computation with a multi-processor structure and may keep efficient operation of the system for controlling computation with the multi-processor structure.

The embodiments of the disclosure provide a method for controlling heat dissipation of a computation resource, the method including that:

whether there is a need for enabling or disabling a computation resource is determined on the basis of a preset condition;

when there is a need for enabling a computer resource, the computation resource to be enabled is determined according to distances between each computation resource in computation resources in a disabled state and computation resources in an enabled state on the basis of a spatial position layout of computation resources in a current operating state, and the computation resource to be enabled is enabled; and when there is a need for disabling a computer resource, the computation resource to be disabled is determined according to distances between the computation resources in the enabled state on the basis of the spatial position layout of the computation resources in the current operating state, and the computation resource to be disabled is disabled.

In one embodiment, when there is a need for enabling a computer resource or when there is a need for disabling a computer resource, the method may further include the following step that:

a type of a computation group to which each of the computation resources currently in the enabled state belongs is determined; and the step that the computation resource to be enabled is determined according to the distances between each of the computation resources in the disabled state and the computation resources in the enabled state may include that:

a computation resource to be enabled is selected from the computation resources in the disabled state in the computation group of the same type according to the distances between each of the computation resources in the disabled state and the computation resources in the enabled state, or the step that the computation resource to be disabled is determined according to the distances between the computation resources in the enabled state may include that:

a computation resource to be disabled is selected from the computation resources in the enabled state according to the distances between the computation resources in the enabled state in the computation group of the same type and computation resources in the enabled state in a computation group of another type, or a computation resource to be disabled is selected from a part of the computation resources in the enabled state, wherein the part of the computation resources in the enabled state may be divided in the computation resources in the enabled state on the basis of one of or a combination of two or more of a load rate of each computation resource, service time of the computation resources in the enabled state and operating tasks of the computation resources.

In one embodiment, the spatial position layout of each computation resource in the current operating state may be obtained by the step that:

positions of the computation resources in the enabled state and the computation resources in the disabled state are acquired to form the spatial position layout according to the current operating state of each computation resource on the basis of a physical layout of all the computation resources.

In one embodiment, the step that the computation resource to be enabled is determined according to the distances between each of the computation resources in the disabled state and the computation resources in the enabled state may include that:

the distances between each of the computation resources in the disabled state and the computation resources in the enabled state are determined, the computation resources at maximum distances away from each computation resource in the enabled state are selected from the computation resources in the disabled state, and if the computation resources at the maximum distances are the same computation resource, the computation resource is determined as the computation resource to be enabled; or the computation resource spaced from each computation resource in the enabled state by at least one computation resource in the disabled state is selected from the computation resources in the disabled state, and the computation resource is determined as the computation resource to be enabled.

In one embodiment, the step that the computation resource to be enabled is determined according to the distances between each of the computation resources in the disabled state and the computation resources in the enabled state may further include that:

the distances between the computation resources in the disabled state and the computation resources in the enabled state are determined, the computation resources at minimum distances away from each computation resource in the enabled state are selected from the computation resources in the disabled state, and if the computation resources at the minimum distances are the same computation resource, the computation resource at the minimum distances is excluded when performing selection from the computation resources in the disabled state.

In one embodiment, in the method, when the computation resource to be enabled includes multiple alternate computation resources, a candidate computation resource meeting one of a condition that a current temperature is lowest and a condition that a disabled duration is longest is selected as a computation resource to be enabled having a highest enabling priority.

In one embodiment, the step that the computation resource to be disabled is determined according to the distances between the computation resources in the enabled state may include that:

a type of a computation group to which each of the computation resources currently in the enabled state belongs is determined; and when there exist at least two computation resources in the enabled state in the computation group of the same type, distances between each of the at least two computation resources and currently operating computation resources in a computation group of another type are determined, the computation resource corresponding to minimum distance values is determined, and the computation resource is determined as the computation resource to be disabled.

In one embodiment, the step that the computation resource to be disabled is determined according to the distances between the computation resources in the enabled state may include that:

one of or a combination of two or more parameters of the a load rate of each computation resource in the enabled state, a service time of the computation resources in the enabled state and operating tasks of the computation resources in the enabled state is monitored;

when the computation resource to be disabled determined according to the distances between the computation resources in the enabled state includes a plurality of computation resources, the computation resource meeting at least one of a condition that the load rate is lowest, a condition that the load rate is within a preset range, a condition that the service time is longest and a condition that no human-computer interaction processing related operating task is executed is selected as a computation resource to be disabled having a highest disabling priority; or the computation resource meeting at least one of the condition that the load rate is lowest, the condition that the load rate is within a preset range, the condition that the service time is longest and the condition that no human-computer interaction processing related operating task is executed is selected as the computation resource to be disabled, and when there exist at least two computation resources to be disabled in the computation group of the same type, the computation resource adjacent to more computation resources in the enabled state is selected from the at least two computation resources to be disabled as a computation resource to be disabled having a highest disabling priority.

The embodiments of the disclosure further provide a system for controlling computation, which may include:

a resource monitoring module, configured to determine whether there is a need for enabling or disabling a computer resource on basis of a preset condition; and a heat dissipation management module, configured to, when there is a need for enabling a computer resource, determine the computation resource to be enabled according to distances between each computation resource in computation resources in a disabled state and computation resources in an enabled state on the basis of a spatial position layout of computation resources in a current operating state and enable the computation resource to be enabled, and further configured to, when there is a need for disabling a computer resource, determine the computation resource to be disabled according to distances between the computation resources in the enabled state on the basis of the spatial position layout of the computation resources in the current operating state and disable the computation resource to be disabled.

In one embodiment, the system may further include:

a first timer, configured to record disabled durations of the computation resources in the disabled state in a disabled mode, and a thermal sensor, configured to detect current temperatures of the computation resources in the disabled state, and the heat dissipation management module may further be configured to, when the computation resource to be enabled includes a plurality of computation resources, search the computation resource meeting one of a conditions that the current temperature is lowest and a condition that the disabled duration is longest as a computation resource to be enabled having a highest enabling priority;

and/or the system may further include:

a second timer, configured to record service time of the computation resources in the enabled state in an enabled mode, a load monitor, configured to detect a load rate of each computation resource in the enabled state, and a task process manager, configured to monitor operating tasks of the computation resources in the enabled state, and the heat dissipation management module may further be configured to, when the computation resource to be disabled determined according to the distances between the computation resources in the enabled state includes a plurality of computation resources, select the computation resource meeting at least one of a condition that the load rate is lowest, a condition that the load rate is within a preset range, a condition that the service time is longest and a condition that no human-computer interaction processing related operating task is executed as a computation resource to be disabled having a highest disabling priority, or may further be configured to select the computation resource meeting at least one of the condition that the load rate is lowest, the condition that the load rate is within a preset range, the condition that the service time is longest and the condition that no human-computer interaction processing related operating task is executed as the computation resource to be disabled, and when there exist at least two computation resources to be disabled in a computation group of the same type, select the computation resource adjacent to more computation resources in the enabled state from the at least two computation resources to be disabled as a computation resource to be disabled having a higher disabling priority.

The embodiments of the disclosure further provide a computer storage medium, in which a computer-executable instruction may be stored, the computer-executable instruction being configured to execute the method for controlling heat dissipation of a computation resource of the embodiments of the disclosure.

According to the method for controlling heat dissipation of a computation resource, the system for controlling computation and the storage medium, the computation resources (for example, processors) may effectively be selected for enabling and/or disabling processing on the basis of a spatial position layout of multiple processors to reduce thermal interaction influence between the computation resources and retard the condition of forcible reduction in performance during conventional heat dissipation management at a high temperature, thereby keeping efficient operation of the system for controlling computation with a multi-processor structure.

DETAILED DESCRIPTION

For making the purpose, technical solutions and advantages of the disclosure clearer, the disclosure will further be described below in combination with the drawings and embodiments in detail. It should be understood that the specific embodiments described here are adopted not to limit the disclosure but only to explain the disclosure.

In the embodiments of the disclosure, a control method for computation resources is provided. A computation resource may be a core of a CPU in a processor, and the processor is a System on Chip (SoC) processing chip including a plurality of computation resources. For example, a CPU of an existing typical processor for a mobile terminal, like a multi-core Snapdragon™ processor of the Qualcomm Incorporated for mobile phones, may have 4, 6 or 8 cores. The computation resource may further be a Graphics Processing Unit (GPU) in the processor. It can be understood that those skilled in the art may realize that the computation resource is not limited to the above two, and in another implementation, the computation resource may be a component with a calculation capability in a processor, such as a core, a master core, a sub-core and a hardware engine. The computation resource may be a single one or combination of the abovementioned types.

Figure 1:
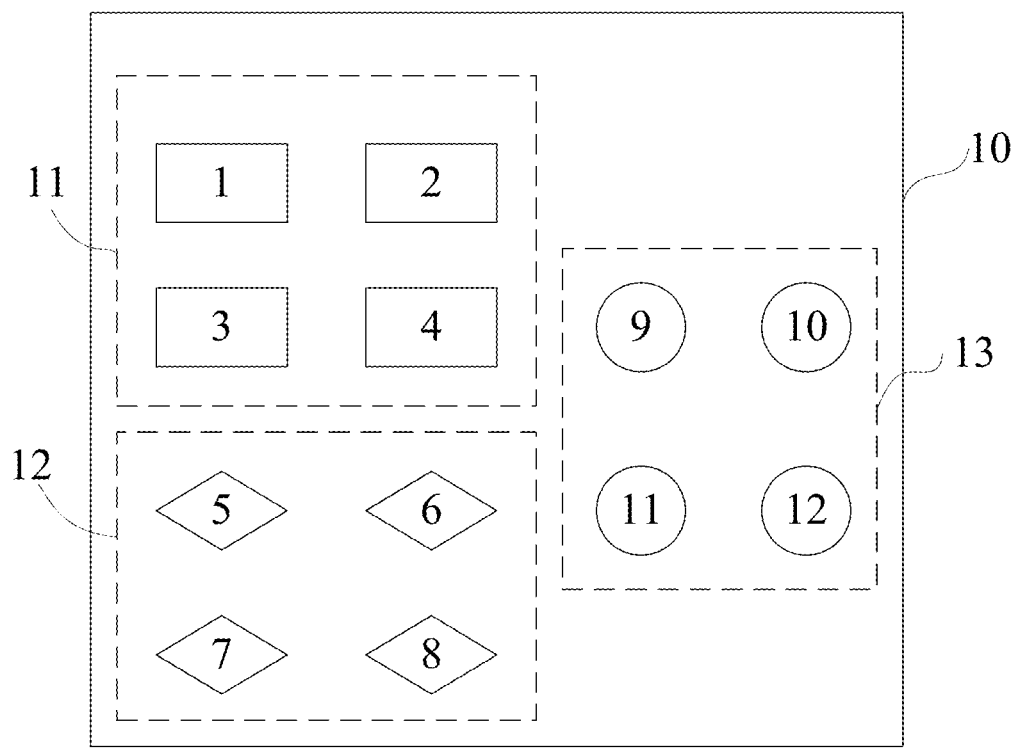
FIG. 1 is a schematic diagram of a multi-processor system structure according to an embodiment of the disclosure.

In addition, in some embodiments of the disclosure, each computation resource may be enabled (energized) to perform computation, undertake a task process and the like, and may be disabled (de-energized) to reduce power consumption. Therefore, each computation resource may have at least enabled and disabled modes. FIG. 1 schematically shows an SoC processing chip for an intelligent mobile terminal, which includes three heterogeneous computation groups (11, 12 and 13), totally 12 computation resources (1 to 12). Each computation resource may be in an enabled or disabled operating state. The computation resources in each computation group may be a CPU, a GPU or a Visual Processing Unit (VPU). In the embodiments, a plurality of computation resources are mainly controlled to be enabled or disabled, and moreover, the plurality of computation resources are divided into multiple computation groups. Considering power and performance, each computation group (i.e., a processing unit group mentioned below) is provided with a software adaptor, and the specific computation resources which should be enabled or disabled in the group are determined according to a real-time service condition. An enabling or disabling condition may be determined according to a task number of a system or a load condition of currently working computation resources. Once a new computation resource is determined to be dynamically enabled to collaboratively operate to improve performance or an enabled computation resource is selected to be disabled to save power, it is necessary to implement optimal selection of the computation resources by virtue of a method and system provided by the disclosure, including "selection of the new computation resource" and "selection of the computation resource to be disabled".

Figure 2:
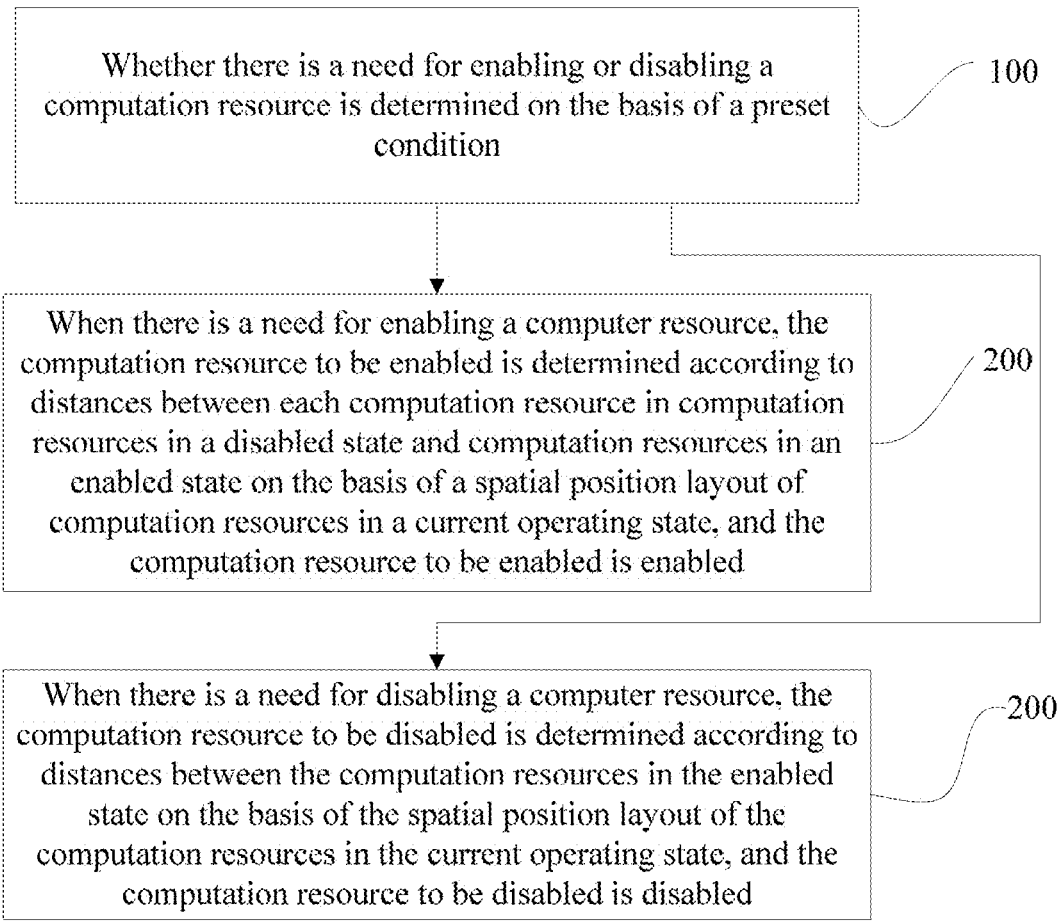
FIG. 2 is an example diagram of a heat dissipation control method according to an embodiment of the disclosure.

As shown in FIG. 2, one embodiment of the disclosure provides a control method for computation resources.

In Step 100, whether there is a need for enabling or disabling a computation resource is determined on the basis of a preset condition.

In an implementation, the preset condition may be whether a task number of a system meets a predetermined condition or not, whether workloads of currently operating computation resources meet a predetermined condition or not and the like. Magnitudes of the workloads may be measured by virtue of utilization rates of the computation resources. It can be understood that the preset condition is not limited to the two, and when necessary, another parameter may be monitored to determine whether there is a need to enable or disable a computation resource or not. For example, temperatures of the currently operating computation resources are monitored, and if the temperatures are kept higher or lower than a preset threshold value for a predetermined time, another computation resource is enabled or disabled.

In the embodiment of the disclosure, an adopted condition for enabling a new computation resource includes: increase of a work task number and increase of the loads of the computation resources, i.e., a condition under which the new computation resource is required to be enabled for collaborative computation, for example, the task number of the system reaches a set value and a load rate of the system exceeds a set value. In the embodiment of the disclosure, an adopted condition for disabling a computation resource is opposite to the abovementioned condition: decrease of the work task number or decrease of the load, thus it is unnecessary to enable so many computation resources and keep them in a working state, and then the most proper computation resource may be selected to be disabled by the disclosure. In the embodiment, the task number, processes and the like of the system may be monitored through a task process manager. Workload conditions of the computation resources may be measured by load rates, for example, whether the workloads of the currently operating computation resources meet a predetermined condition or not, that is, whether the load rates of the currently operating computation resources meet a predetermined condition or not.

A load rate of a computation resource, just as its name implies, refers to a statistic about a service condition of the computation resource within a time period, an occupation condition of the computation resource within a certain time period may be known from this index, if an occupation time is very long, it is necessary to consider whether the computation resource has been overloaded or not, and long-term overloaded operation may keep electronic equipment in a high-temperature state for a long time, which is harmful to the electronic equipment. Therefore, the load rate of the computation resource is required to be controlled to be lower than a certain rate, that is, a working temperature of the computation resource is kept within a certain range, to ensure normal operation of the electronic equipment. In some embodiments of the disclosure, a dynamically loaded component in an operating system of the electronic equipment may be adopted to detect a load rate of each computation resource in a multi-computation-resource structure in real time. The component may be a drive configured to detect the load rate of each computation resource, and the drive may be hardware, and may also be a software set.

In Step 200, when there is a need for enabling a computer resource, the computation resource to be enabled is determined according to distances between each computation resource in computation resources in a disabled state and computation resources in an enabled state on the basis of a spatial position layout of computation resources in a current operating state, and the computation resource to be enabled is enabled; and when there is a need for disabling a computer resource, the computation resource to be disabled is determined according to distances between the computation resources in the enabled state on the basis of the spatial position layout of the computation resources in the current operating state, and the computation resource to be disabled is disabled. It can be understood that, when it is determined in Step 100 that the computation resource is required to be enabled, only the computation resource to be enabled is determined and then the computation resource to be enabled is enabled in Step 200; and when it is determined in Step 100 that when there is a need for disabling a computer resource, only the computation resource to be disabled is determined and then the computation resource to be disabled is disabled in Step 200.

The spatial position layout in the embodiment refers to a layout of the computation resources in the current operating states in a physical space, and may specifically be acquired in the following manner.

Figure 6:
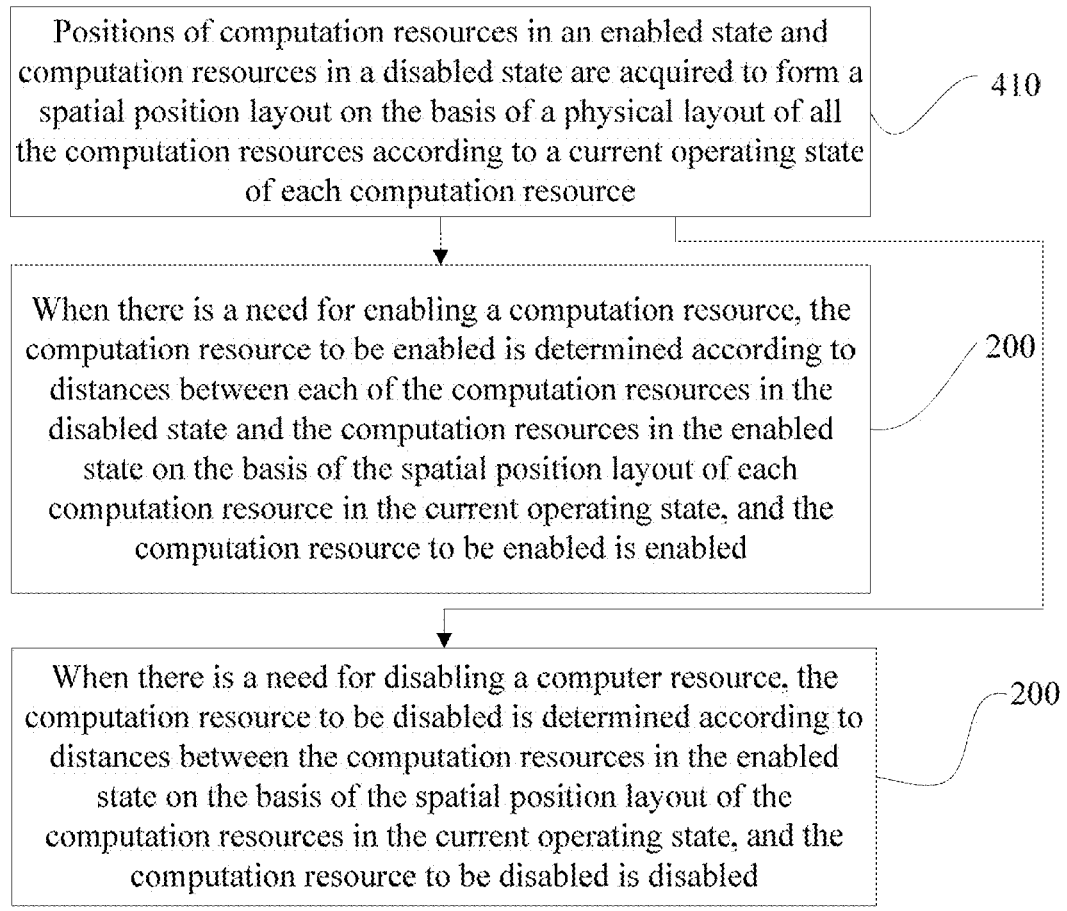
FIG. 6 is an example diagram of a heat dissipation control method according to another embodiment of the disclosure.

In one embodiment of the disclosure, as shown in FIG. 6, the spatial position layout of each computation resource in the current operating state is obtained by the following step.

In Step 410, positions of the computation resources in the enabled state and the computation resources in the disabled state are acquired to form the spatial position layout on the basis of a physical layout of all the computation resources according to the current operating state of each computation resource.

Figure 3:
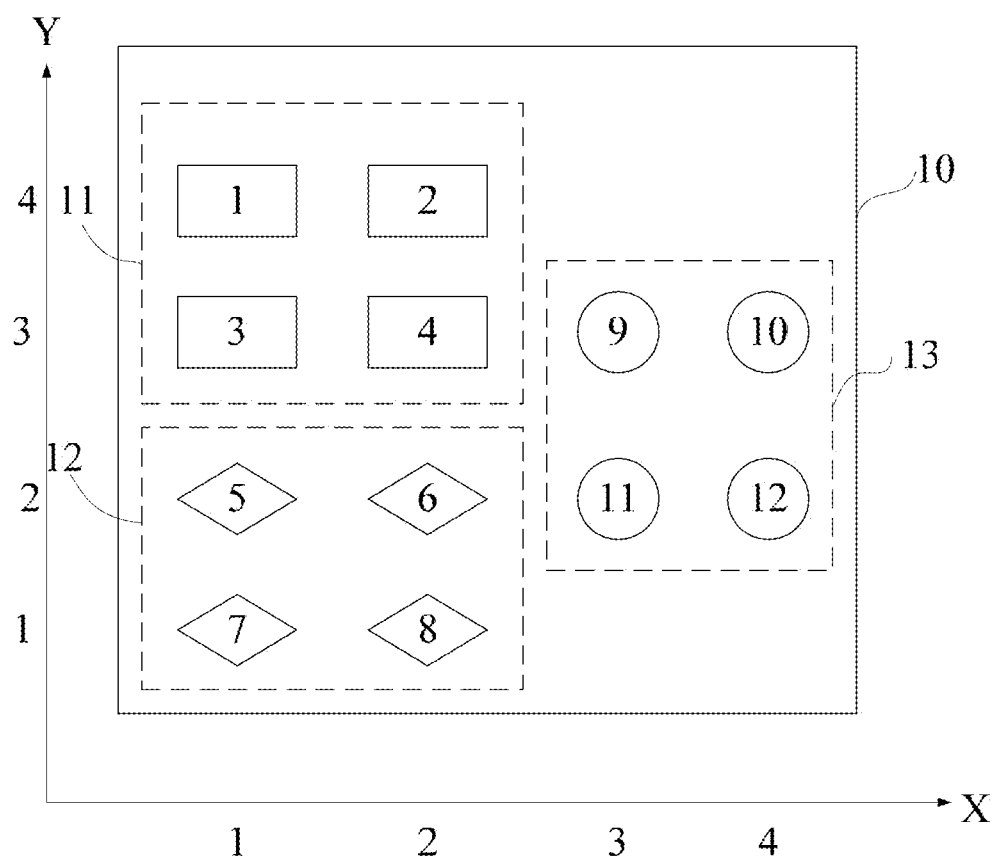
FIG. 3 is a schematic diagram of scaling positions of a multi-processor system structure according to an embodiment of the disclosure.

The distances between each computation resource may be predetermined, and a distance relationship is stored for use during determination of the computation resource to be enabled/disabled. For example, a rectangular coordinate system is established on the basis of the spatial position layout of a plurality of computation resources, and then the position of each computation resource may be accurately determined. For example, in a coordinate system shown in FIG. 3, a position (1, 1) corresponds to a computation resource 7, a position (1, 2) corresponds to a computation resource 8, the position (1, 2) corresponds to the computation resource 8, a position (2, 1) corresponds to a computation resource 5, a position (2, 2) corresponds to a computation resource 6, a position (2, 3) corresponds to a computation resource 11, a position (2, 4) corresponds to a computation resource 12, a position (3, 1) corresponds to a computation resource 3, a position (3,2) corresponds to a computation resource 4, a position (3, 3) corresponds to a computation resource 9, a position (1, 4) corresponds to a computation resource 10, a position (1, 4) corresponds to a computation resource 1, and a position (2, 4) corresponds to a computation resource 1. Similarly, three-dimensional space coordinates may also be set to determine the positions according to spatial positions of the plurality of computation resources. A simpler manner may further be adopted, and the plurality of computation resources are directly numbered, for example, computation resource 1, . . . , computation resource 12 in FIG. 1. The positions may further be determined according to the circularly arranged computation resources and according to polar coordinates. After the positions are determined, the distance between every two computation resources may be determined, and the distance relationship is stored. Meanwhile, correspondence between the operating state and position of each computation resource is achieved to obtain the spatial position layout according to the monitored current operating state of each computation resource. The operating state includes the enabled or disabled state.

In an implementation, for Step 100, a type of the computation resource to be enabled or disabled may further be confirmed. For example, in FIG. 1, computation resources in the same computation group may process tasks of the same type, and computation resources in different computation groups process different types of tasks. For example, a first computation group includes multiple CPUs, a second computation group includes multiple GPUs, and the like. Then, the first computation group and the second computation group are of two types respectively, and the computation resources therein belong to different types respectively.

If a load of a computation resource in a computation group 11 exceeds a predetermined threshold value for a certain time, a computation resource may be enabled to share a part of its workload. At this moment, the newly enabled computation resource and the currently operating computation resource are required to belong to the same type, that is, both of them belong to the computation group 11. For another example, if a load of a computation resource in a computation group 13 exceeds the predetermined threshold value for a certain time, when there is a new task required to be processed by the computation resources in the computation group 13, a type of a newly enabled computation resource should be that of the computation group 13. After the type of the computation resource to be enabled or disabled is determined, in Step 200, a type of a computation group to which the computation resource to be enabled or the computation resource to be disabled belongs may be determined according to the determined type. Therefore, in an implementation, when there is a need for enabling a computer resource or when there is a need for disabling a computer resource, the method further includes the following steps.

At first, a type of a computation group to which each of the computation resources currently in the enabled state belongs is determined.

Then, a computation resource to be enabled is selected from the computation resources in the disabled state in the computation group of the same type according to the distances between each of the computation resources in the disabled state and the computation resources in the enabled state. For example, the second computation group includes multiple GPUs, and when there is a need for enabling a computer resource, one or more GPUs are selected from the computation resources in the disabled state in the second computation group as computation resources to be enabled.

Alternatively, in the step that the computation resource to be disabled is determined according to the distances between the computation resources in the enabled state: a computation resource to be disabled is selected from the computation resources in the enabled state according to the distances between the computation resources in the enabled state in the computation group of the same type and the computation resources in the enabled state in a computation group of another type. For example, the first computation group includes multiple CPUs, and when the computation resource in the enabled state is required to be disabled, the specific computation resource in the enabled state is selected from the first computation group to be disabled on the basis of distances between the computation resources in the enabled state in the first computation group and the GPUs in the enabled state in the second computation group. In the embodiment, the computation resource to be disabled or its alternatives may be selected according to the distances between the computation resources, so that convenience for computation and high accuracy are achieved, and moreover, effective heat dissipation management is more facilitated. The computation resource most favorable for heat accumulation is determined by distance recognition, and the computation resource is disabled to implement heat dissipation management.

Of course, the following embodiment may also be adopted. At first, a part of the computation resources in the enabled state is divided in the computation resources in the enabled state as alternatives on the basis of one of or a combination of two or more of a load rate of each computation resource, service time of the computation resources in the enabled state and operating tasks of the computation resources, and then a computation resource to be disabled is selected from the part of the computation resources in the enabled state according to the distances between the computation resources in the enabled state in the computation group of the same type and the computation resources in the enabled state in a computation group of another type. In the embodiment, a priority of the computation resource to be disabled may be set according to any one parameter in the load rates, the service time and the operating tasks in combination with a distance vector, so that heat dissipation management may be implemented more accurately and effectively.

In an implementation of the disclosure, selection of the computation resource to be enabled from the computation resources in the disabled state may be selected from the computation resources in the disabled state and of a specific type. Selection of the computation resource to be disabled from the computation resources in the enabled state may be selected from the computation resources in the enabled state and of a specific type.

In an implementation of the disclosure, when the computation resource to be enabled is determined, the computation resource to be enabled may be determined through one of the following rules.

1) The distances between each computation resource in the disabled state and the currently operating computation resources (i.e., the computation resources in the enabled state) are determined, the computation resources at maximum distances away from each currently operating computation resource are selected from the computation resources in the disabled state, and if the computation resources at the maximum distances are the same computation resource, the computation resource is determined as the computation resource to be enabled. Since the distances between the newly enabled computation resource and all the currently operating computation resources are maximum, influence on heat dissipation of all the currently operating computation resources is least. Otherwise, if the distance between the newly enabled computation resource and one or more currently operating computation resources is very short, heat may be produced after it is started, and if the distance is shorter, influence on heat dissipation of each other is more. For example, in FIG. 4, computation resources 4 and 1 currently operate, and if a computation resource in a computation group 11 is required to be newly enabled, according to the rule, distances between a computation resource 1 and the currently operating computation resources 4 and 11 are both longer than distances between computation resources 2 and 3 and the computation resources 4 and 11, so that the computation resource 1 is determined as a computation resource to be enabled. Compared with enabling of the computation resource 2 or 3, enabling the computation resource 1 is most favorable for heat dissipation of the currently operating computation resources 4 and 11.

2) The distances between each computation resource to be selected and the currently operating computation resources are determined, the computation resources at minimum distances away from each computation resource are selected therefrom, and if the computation resources at the minimum distances are the same computation resource, the computation resource at the minimum distances is excluded, and a computation resource to be enabled is selected from the other computation resources to be selected. That is, selection in Step 1) is executed after the computation resource at the minimum distances is excluded when performing selection from the computation resources in the disabled state. For example, in FIG. 4, if a computation resource in a computation group 12 is required to be enabled, distances between a computation resource 6 and the currently operating computation resources 4 and 11 are minimum compared with computation resources 5, 7 and 8, and enabling the computation resource 6 is most unfavorable for heat dissipation of the computation resources 4 and 11. Therefore, one of the computation resources 5, 7 and 8 to be selected is selected to be enabled. A selection standard may be a temperature and/or a duration for which the disabled state is kept. For example, the computation resource at a lowest temperature may be selected, a computation resource which is kept in the disabled state for a long time may be selected, and one computation resource may also be randomly selected.

Figure 4:
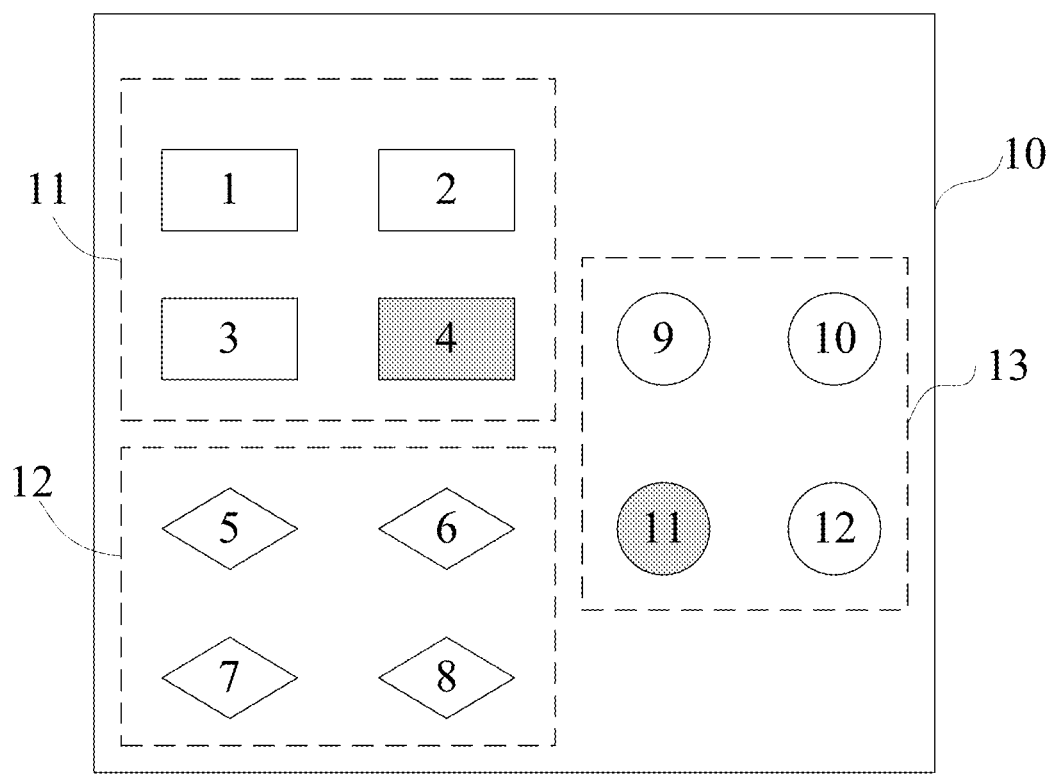
FIG. 4 is a schematic diagram of an operating state 1 of a multi-processor system structure according to an embodiment of the disclosure.

3) The distances between each of the computation resources in the disabled state and the computation resources in the enabled state are determined, the computation resource spaced from each computation resource in the enabled state by at least one computation resource in the disabled state is selected from the computation resources in the disabled state, and the computation resource is determined as the computation resource to be enabled. Specifically, if the selected computation resource is the same computation resource, the computation resource may be determined as the computation resource to be enabled. As shown in FIG. 4, there exists at least one computation resource in the disabled state between the computation resource 7 and each of the computation resources 4 and 11 in the enabled state, and enabling the computation resource 7 is most favorable for heat dissipation of the computation resources 4 and 11 and may accumulate no heat.

It can be understood that the predetermined rules are not limited to those mentioned above. Since there may be many changes in a practical layout of the computation resources, a proper rule may be set according to a practical condition. A main standard for setting the rule includes that: the computation resource with least influence on heat dissipation of the currently operating computation resources is selected by taking the distance as a judgment criterion. When there exist multiple objects to be selected, other factors may be considered. For example, when there is a need for enabling a computer resource, the computation resource to be enabled is determined on the basis of the spatial position layout of each computation resource in the current operating state according to the distances between each of the computation resources in the disabled state and the computation resources in the enabled state.

In one embodiment of the disclosure, when the computation resource to be enabled determined in the abovementioned process includes multiple alternate computation resources, for example, the alternate computation resources may be a plurality of computation resources, obtained by the abovementioned method, at the maximum distances, or the alternate computation resources may further be a plurality of computation resources selected from the computation resources in the disabled state and spaced from each computation resource in the enabled state by at least one computation resource in the disabled state, the predetermined rules may further include the following condition:

a candidate computation resource meeting one of a condition that a current temperature is lowest and a condition that a disabled duration is longest is selected as a computation resource to be enabled having a highest enabling priority, wherein the current temperature and/or disabled duration of each computation resource in a disabled mode in the computation resources in the disabled state are/is detected to provide a basis for such a searching process. In the embodiment of the disclosure, the current temperatures and the disabled durations are detected to select the computation resource which is not used for a long time and/or the computation resource at a relative low temperature to be preferably enabled to implement collaborative computation after enabling, and in such a manner, a time point when performance is suppressed by heat dissipation management may be reached later under a high-load condition.

In some embodiments of the disclosure, a timer may be adopted to determine the disabled durations of the computation resources in the disabled state. Meanwhile, the timer may further be adopted to determine the service time of the computation resources in the enabled state. Then, one or two timers may be configured for a computation resource, and are configured to record the disabled duration or an enabled duration respectively. Of course, one timer may also be configured for a plurality of computation resources.

In one embodiment of the disclosure, the method further includes that: a current temperature of each computation resource is detected. The current temperature of each computation resource may be detected by adopting a thermal sensor. For example, a thermal sensor may be configured beside each computation resource in an existing processing chip for an intelligent mobile terminal to detect a temperature of the corresponding computation resource. The thermal sensor may be adopted to acquire temperatures of a plurality of computation resources in real time. Here, there may be one or more thermal sensors. For example, each computation resource is configured with a thermal sensor, or the temperatures of the plurality of computation resources are detected by one thermal sensor respectively.

In an implementation of the disclosure, when the computation resource to be disabled is determined, the computation resource to be disabled may be determined through the following rule.

Figure 5:
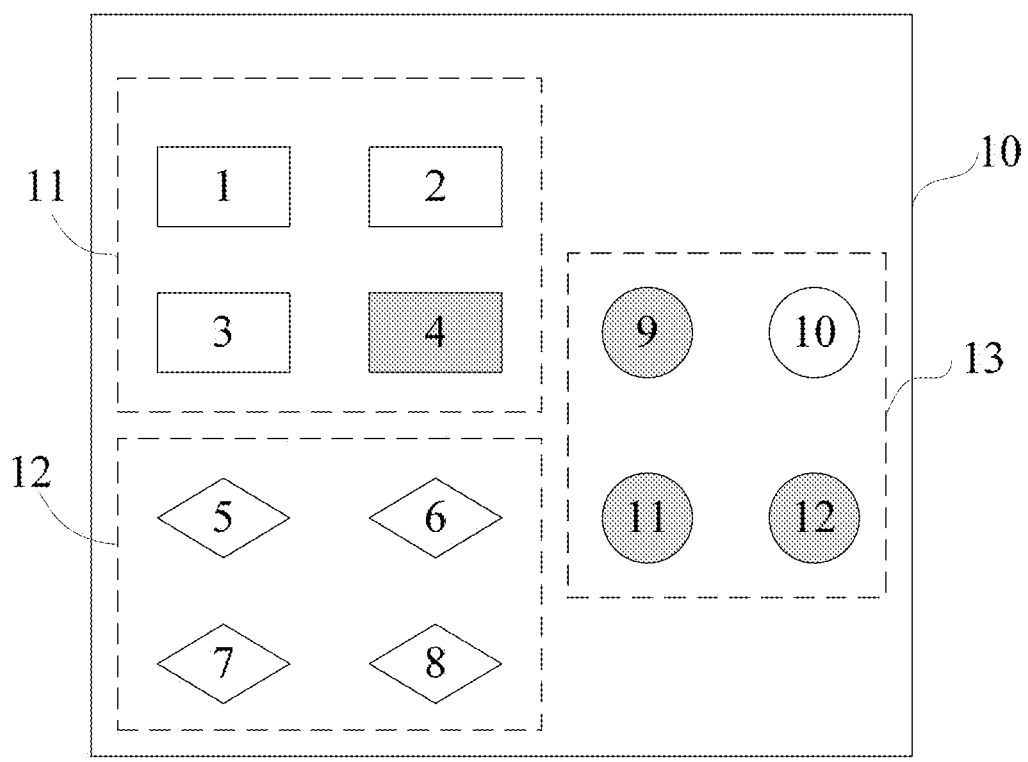
FIG. 5 is a schematic diagram of an operating state 2 of a multi-processor system structure according to an embodiment of the disclosure.

It is assumed that loads of the currently operating computation resources of the same type are substantially the same. If at least two computation resources in the computation resources of the same type may be disabled, distances between each of the at least two computation resources and currently operating computation resources in another type are determined, and the computation resource corresponding to minimum distance values is determined as a resource to be disabled in the at least two computation resources. For example, in FIG. 5, computation resources 9, 11 and 12 in a computation group 13 may be disabled, and a distance between the computation resource 9 and a computation resource 4 in a computation group 11 is minimum, so that disabling it may be most helpful for heat dissipation of the computation resource 4. It can be understood that, in another implementation, other factors may further be considered, for example, the temperature and an operating time. For example, the computation resources 9, 11 and 12 in the computation group 13 may be disabled, an operating time of the computation resource 11 is longest, and although its distance away from the computation resource 4 is not minimum, the computation resource 11 may be selected as a computation resource to be disabled. For another example, a temperature of the computation resource 12 is highest, the computation resource 11 may also be selected as a computation resource to be disabled, and this is because heat dissipation of both the computation resources 12 and 4 is helped.

Therefore, in one embodiment of the disclosure, the computation resource to be disabled is determined according to the distances between the currently operating computation resources. Specifically, in Step 200, the step that the computation resource to be disabled is determined according to the distances between the computation resources in the enabled state includes the following steps.

At first, a type of a computation group to which each of the computation resources currently in the enabled state belongs is determined.

Then, when there exist at least two computation resources in the enabled state in the computation group of the same type, distances between each of the at least two computation resources and currently operating computation resources in a computation group of another type are determined, the computation resource corresponding to minimum distance values is determined, and the computation resource is determined as the computation resource to be disabled. The types of the computation groups may refer to related descriptions made before.

Furthermore, when the minimum distance values correspond to a plurality of computation resources, the computation resource adjacent to more computation resources in the enabled state in the group is selected as a computation resource to be disabled having a highest disabling priority for preferable disabling processing according to a distance relationship between the computation resources in the group in the computation group of the same type.

Thus it can be seen that, in the embodiment, a priority of the computation resource to be disabled may be set by virtue of the distance relationship between the computation resources, and then the computation resource most helpful for heat dissipation is determined by virtue of the distance relationship between the computation resources at first.

In one embodiment of the disclosure, the step that the computation resource to be disabled is determined according to the distances between the computation resources in the enabled state further includes that:

one of or a combination of two or more parameters of the a load rate of each computation resource in the enabled state, a service time of the computation resources in the enabled state and operating tasks of the computation resources in the enabled state is monitored;

when the computation resource to be disabled determined according to the distances between the computation resources in the enabled state includes a plurality of computation resources, the computation resource meeting at least one of a condition that the load rate is lowest, a condition that the load rate is within a preset range, a condition that the service time is longest and a condition that no human-computer interaction processing related operating task is executed is selected as a computation resource to be disabled having a highest disabling priority. The process of determining a computation resource to be disabled according to the distances between the computation resources in the enabled state may refer to related descriptions made before.

In the embodiment of the disclosure, the alternate computation resource to be disabled is selected through detection results of the load rates, the service time, the operating tasks and the like, and in such a manner, the computation resource most helpful for heat dissipation may be disabled under the high-load condition to implement heat dissipation and cooling as fast as possible rather than achieving the purpose of cooling by forcibly sacrificing the performance. According to the method of the embodiment, the computation resource in the enabled state may be selected to be disabled according to the following priorities: 1) the computation resource which is idle and most helpful for heat dissipation is disabled, that is, the computation resource to be disabled is determined according to the distances between the computation resources in the enabled state and the load rate of the computation resource is lowest; 2) the computation resource which is used for a long time and most helpful for heat dissipation is disabled, that is, the computation resource to be disabled is determined according to the distances between the computation resources in the enabled state and its service time is longest; and 3) the computation resource which is non-idle but least busy and most helpful for heat dissipation is disabled, that is, the computation resource to be disabled is determined according to the distances between the computation resources in the enabled state and no human-computer interaction processing related operating task is executed. The definition most helpful for heat dissipation refers to selection of an object most likely to produce and accumulate heat together with own group or another computation group.

Then, in some embodiments of the disclosure, in Step 200, when there is a need for disabling a computer resource, one of or a combination of two or more parameters of the a load rate of each computation resource in the enabled state, a service time of the computation resources in the enabled state and operating tasks of the computation resources in the enabled state is monitored; and second alternate computation resources which have the lowest load rates, which have longest service time and do not execute any human-computer interaction processing related operating task and of which the load rates are within the preset range and which do not execute any human-computer interaction processing related operating task are sequentially selected, and the selected second alternate computation resources are disabled one by one to implement heat dissipation management.

Of course, when there is a need for disabling a computer resource, one of or a combination of two or more parameters of the a load rate of each computation resource in the enabled state, a service time of the computation resources in the enabled state and operating tasks of the computation resources in the enabled state may further be monitored;

at first, the computation resources with the lowest load rates are selected for disabling processing, and then whether a disabling condition is still met or not is judged;

if YES, the computation resources which have the longest service time and do not execute any human-computer interaction processing related operating task are selected for disabling processing, and then whether the disabling condition is still met or not is judged;

if YES, the computation resources of which the load rates are within the preset range and which do not execute any human-computer interaction processing related operating task are selected for disabling processing, and then whether the disabling condition is still met or not is judged; and if YES, the computation resources are forced to operate in a low-performance mode only.

It is mentioned in the abovementioned embodiments that preferred selection of the computation resource to be disabled is implemented on the basis of the distances with the other computation group, but the technical solutions of the disclosure are not limited. For the computation resources of the same computation group, the following embodiment may further be adopted. Alternatives are selected on the basis of the load rates, the executed tasks and the like, and if there exist more than two (included) selectable computation resources, the computation resources adjacent to other computation resources in the enabled state are selected as computation resources to be disabled, and the computation resources adjacent to more computation resources in the enabled state are preferred. For example, in one embodiment of the disclosure, the step that the computation resource to be disabled is determined according to the distances between the computation resources in the enabled state may further be implemented in the following manner:

one of or a combination of two or more parameters of the a load rate of each computation resource in the enabled state, a service time of the computation resources in the enabled state and operating tasks of the computation resources in the enabled state is monitored; and the computation resource meeting at least one of the condition that the load rate is lowest, the condition that the load rate is within a preset range, the condition that the service time is longest and the condition that no human-computer interaction processing related operating task is executed is selected as the computation resource to be disabled, and when there exist at least two computation resources to be disabled in the computation group of the same type, the computation resource adjacent to more computation resources in the enabled state is selected from the at least two computation resources to be disabled as a computation resource to be disabled having a highest disabling priority.

In the embodiment, a part of the computation resources in the enabled state may be divided as alternatives on the basis of one of or a combination of two or more parameters of the a load rate of each computation resource in the enabled state, a service time of the computation resources in the enabled state and operating tasks of the computation resources in the enabled state, and then the computation resources to be disabled are selected from the part of the computation resources in the enabled state are selected to be preferably disabled according to the distances between the computation resources in the enabled state in the computation group of the same type and the computation resources in the enabled state in a computation group of another type. Similarly, the disabling priority may further be set according to a combination of the condition that the load rate is lowest, the condition that the load rate is within a preset range, the condition that the service time is longest and the condition that no human-computer interaction processing related operating task is executed.

When the computation resource is disabled, the task which is being executed by it must be transferred to another computation resource. Therefore, least influence on a user experience refers to that a current task execution load applied to the computation resource is not high and cost in task transfer during disabling has least influence on the user experience. If a computation resource is busy in execution of a user interaction related task, and is forcibly disabled and forced to transfer the task, the user interaction related task under execution is influenced, must be suspended, and may be re-executed only when the task is successfully transferred to another computation resource. Generally speaking, the conditions with least influence on the user experience and helpful for rapid heat dissipation and cooling are that the task load is highest and the transfer cost is lowest. The temperature is lowest because the computation resource is still and does not work after being disabled, and then heat accumulated in the vicinity may be dissipated towards a low-temperature direction according to the characteristic that "heat runs to low temperature".

Related technical characteristics in each embodiment may be combined, thereby forming new technical solutions. In the method, a new computation resource enabling optimization solution and a disabling optimization solution are provided. "Selection of a new computation resource" is included. When not being used at ordinary times, a computation resource may enter a disabled mode to reduce power consumption, and enabling the new computation resource is to enable a disabled computation resource to enable it to start collaboratively providing a computation capability. Then, in the method, when the new computation resource is selected, a "preferred object which is coldest and has least influence on another computation resource" may be selected, the computation resource which is coldest may be a computation resource which is not used for a longest time or a computation resource at a lowest temperature, and then the object may be helpful for reaching a time point when performance is suppressed by thermal management later under a high-load condition. The computation resource with least influence on the other computation resource refers to that the enabled object starts producing heat once being started, but its heat production condition has least influence on the other computation resource. "Selection of a disabled computation resource" is further included. A design purpose is to implement heat dissipation and cooling as fast as possible without influence on the user experience rather than forcibly sacrificing the performance to achieve the purpose of cooling. When the computation resource is disabled, the computation resource with least influence on the user experience and helpful for fast heat dissipation and cooling is a preferred object.

When enabling management over the computation resource is implemented by virtue of the spatial position layout of the a plurality of computation resources in the system for controlling computation in the method, a method for controlling heat dissipation of a computation resource capable of implementing disabling management over the computation resources by virtue of the spatial position layout of the a plurality of computation resources in the system for controlling computation is further provided. In the method, enabling and disabling management over the computation resources is implemented by virtue of the spatial position layout of the a plurality of computation resources in the system for controlling computation, and the two methods are two reverse processes, supplement each other, may not always be executed at the same time, and may be executed in the same execution process in a time division manner to form a new method for controlling heat dissipation of a computation resource.

From the above descriptions about the implementations, those skilled in the art may clearly learn about that the method according to the embodiment may be implemented in a manner of combining software and a necessary universal hardware platform, and of course, may also be implemented through hardware, but the former is a better implementation manner under many conditions. Based on such an understanding, the technical solutions of the disclosure substantially or parts making contributions to the conventional art may be embodied in form of software product, and the computer software product is stored in a storage medium (for example, a Read-Only Memory (ROM), a magnetic disk, an optical disk and a server storage space), including a plurality of instructions configured to enable a piece of terminal equipment (which may be a mobile phone, a computer, a server, network equipment or the like) to execute the system structure and method of each embodiment of the disclosure.

Figure 7:
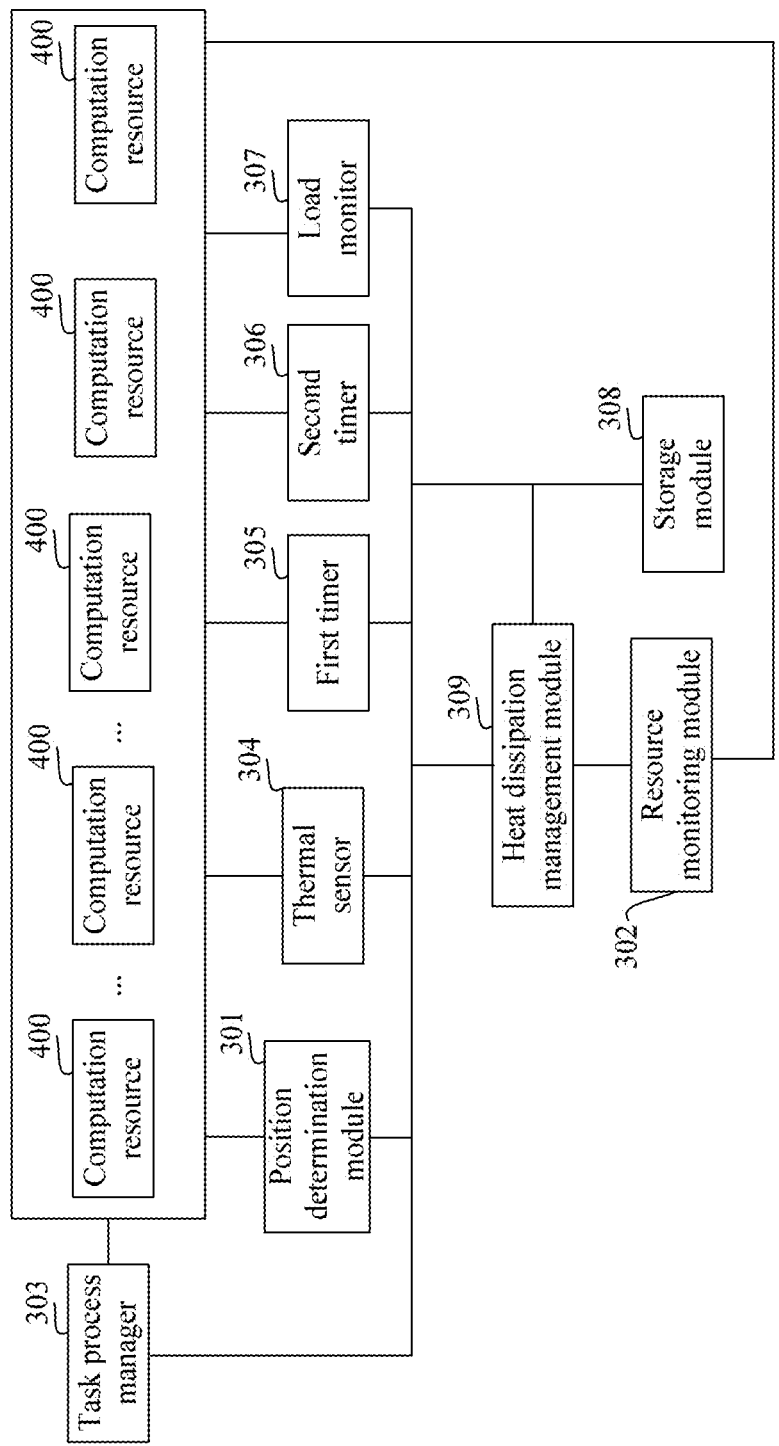
FIG. 7 is a structure diagram of a system according to an embodiment of the disclosure.

For example, a system for controlling computation is further provided in one embodiment of the disclosure, and is applied to the abovementioned chip with a multi-computation-resource layout. As shown in FIG. 7, the system includes a resource monitoring module 302 and a heat dissipation management module 309.

The resource monitoring module 302 is configured to determine whether there is a need for enabling or disabling a computer resource on basis of a preset condition.

The heat dissipation management module 309 is configured to, when there is a need for enabling a computer resource, determine the computation resource to be enabled according to distances between each computation resource in computation resources in a disabled state and computation resources in an enabled state on the basis of a spatial position layout of computation resources in a current operating state and enable the computation resource to be enabled, and further configured to, when there is a need for disabling a computer resource, determine the computation resource to be disabled according to distances between the computation resources in the enabled state on the basis of the spatial position layout of the computation resources in the current operating state and disable the computation resource to be disabled.

In some embodiments of the disclosure, the heat dissipation management module 309 is further configured to, when there is a need for enabling a computer resource or when there is a need for disabling a computer resource, determine types of computation groups to which the computation resources currently in the enabled state belong, and select the computation resource to be enabled from the computation resources in the disabled state in the computation group of the same type according to the distances between each of the computation resources in the disabled state and the computation resources in the enabled state, or the heat dissipation management module 309 is further configured to select the computation resource to be disabled from the computation resources in the enabled state according to the distances between the computation resources in the enabled state in the computation group of the same type and computation resources in the enabled state in a computation group of another type, or select the computation resource to be disabled from a part of the computation resources in the enabled state, wherein the part of the computation resources in the enabled state is determined in the computation resources in the enabled state on the basis of one of or a combination of two or more of a load rate of each computation resource, service time of the computation resources in the enabled state and operating tasks of the computation resources.

In an implementation of the disclosure, the system further includes a position determination module 301. The position determination module 301 is configured to acquire positions of the computation resources in the enabled state and the computation resources in the disabled state to form the spatial position layout on the basis of a physical layout of all the computation resources according to the current operating state of each computation resource, thereby providing an alternate reference for the heat dissipation management module. The position determination module 301 may be configured to execute a forming method process about the spatial position layout in Step 100, which may specifically refer to related descriptions made before.

In an implementation of the disclosure, the heat dissipation management module 309 is further configured to determine the distances between each of the computation resources in the disabled state and the computation resources in the enabled state, select the computation resources at maximum distances away from each computation resource in the enabled state from the computation resources in the disabled state, and if the computation resources at the maximum distances are the same computation resource, determine the computation resource as the computation resource to be enabled; or select the computation resource spaced from each computation resource in the enabled state by at least one computation resource in the disabled state from the computation resources in the disabled state, and determine the computation resource as the computation resource to be enabled.

In an implementation of the disclosure, the heat dissipation management module 309 is further configured to determine the distances between the computation resources in the disabled state and the computation resources in the enabled state, select the computation resources at minimum distances away from each computation resource in the enabled state from the computation resources in the disabled state, and if the computation resources at the minimum distances are the same computation resource, exclude the computation resource at the minimum distances when performing selection from the computation resources in the disabled state.

In an implementation of the disclosure, the system further includes a first timer 305 and a thermal sensor 304.

The first timer 305 is configured to record disabled durations of the computation resources in the disabled state in a disabled mode.

The thermal sensor 304 is configured to detect current temperatures of the computation resources in the disabled state.

The heat dissipation management module 309 is further configured to, when the computation resource to be enabled includes a plurality of computation resources, search the computation resource meeting one of a conditions that the current temperature is lowest and a condition that the disabled duration is longest as a computation resource to be enabled having a highest enabling priority.

In an implementation of the disclosure, the heat dissipation management module 309 is further configured to determine the types of the computation groups to which the computation resources currently in the enabled state belong, and when there exist at least two computation resources in the enabled state in the computation group of the same type, determine distances between each of the at least two computation resources and currently operating computation resources in a computation group of another type, determine the computation resource corresponding to minimum distance values, and determine the computation resource as the computation resource to be disabled.

In an implementation of the disclosure, the system further includes a second timer 306, a load monitor 307 and a task process manager 303.

The second timer 306 is configured to record service time of the computation resources in the enabled state in an enabled mode.

The load monitor 307 is configured to detect a load rate of each computation resource in the enabled state.

The task process manager 303 is configured to monitor operating tasks of the computation resources in the enabled state.

Here, the heat dissipation management module 309 is further configured to, when the computation resource to be disabled determined according to the distances between the computation resources in the enabled state includes a plurality of computation resources, select the computation resource meeting at least one of a condition that the load rate is lowest, a condition that the load rate is within a preset range, a condition that the service time is longest and a condition that no human-computer interaction processing related operating task is executed as a computation resource to be disabled having a highest disabling priority.

Alternatively, the heat dissipation management module 309 is further configured to select the computation resource meeting at least one of the condition that the load rate is lowest, the condition that the load rate is within a preset range, the condition that the service time is longest and the condition that no human-computer interaction processing related operating task is executed as the computation resource to be disabled, and when there exist at least two computation resources to be disabled in a computation group of the same type, select the computation resource adjacent to more computation resources in the enabled state from the at least two computation resources to be disabled as a computation resource to be disabled having a highest disabling priority.

The resource monitoring module 302 is configured to execute Step 100, the heat dissipation management module 309 is configured to execute Step 200, and related specific details may refer to related descriptions made before, and will not be elaborated herein. There may be one or more first timers and second timers. In addition, the position determination module 301 and the heat dissipation management module 309 may be implemented by a single additional computation resource or multiple additional computation resources, and may also be implemented by one or more computation resources in the a plurality of computation resources 400 in a time division manner. The task process manager 303 provides information about computer performance, displays detailed information of programs and processes operated on a computer, and for example, may be configured to monitor current states of the programs operated on all the computation resources. The task process manager 303 provides the information about the computer performance, displays the detailed information of the programs and processes operated on the computer, and for example, may be configured to monitor the current states of the programs operated on all the computation resources.

In some embodiments of the disclosure, the load monitor 307 may adopt a component dynamically loaded in an operating system of electronic equipment to detect a load rate of each computation resource in real time. The component may be a drive configured to detect the load rate of each computation resource, and the drive may be hardware, and may also be a software set.

In some embodiments of the disclosure, the system further includes a storage module 308.

The heat dissipation management module 309 is further configured to sequence each computation resource 400 in a descending order from high to low load rates, service time, disabled durations, current temperatures and the like according to the parameters, simultaneously detected by one or more than two modules in the load monitor 307, the thermal sensor 304, the first timer, the second timer, the position determination module, the task process manager and the like, such as the temperatures and load rates of the a plurality of computation resources 400 to acquire an index table of the computation resources 400 and their corresponding parameters such as the temperatures and the load rates, and store the index table in the storage module 308. The heat dissipation management module 309 may find a proper computation resource from the computation resources according to the index table. Therefore, a service condition of each computation resource may be monitored in real time.

In the embodiments of the disclosure, a computation resource control device may be implemented by a personal computer during a practical application. The resource monitoring module 302, heat dissipation management module 309, position determination module 301, first timer 305, second timer 306, load monitor 307 and task process manager 303 in the computation resource control device may all be implemented by a CPU, Digital Signal Processor (DSP), Microcontroller Unit (MCU) or Field-Programmable Gate Array (FPGA) in the device; and the storage module 308 in the computation resource control device may be implemented by a memory in the device.

According to the method for controlling heat dissipation of a computation resource, the system for controlling computation and the storage medium, the computation resources (for example, the computation resources) may effectively be selected for enabling and/or disabling processing on the basis of a spatial position layout of multiple processors to reduce thermal interaction influence between the computation resources and retard the condition of forcible reduction in performance during conventional heat dissipation management at a high temperature, thereby keeping efficient operation of the system for controlling computation with a multi-processor structure.

Each technical characteristic of the abovementioned embodiments may be freely combined. For brief description, not all possible combinations of each technical characteristic in the abovementioned embodiments are described. However, combinations of these technical characteristics may be considered to fall within the scope recorded in the specification without conflicts.

In some embodiments provided by the application, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit. The integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as mobile storage equipment, a Read-Only Memory (ROM), a Random Access Memory (RAM), a magnetic disk or an optical disk.

Alternatively, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The abovementioned storage medium includes: various media capable of storing program codes such as mobile storage equipment, a ROM, a Random Access Memory (RAM), a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the technical solutions of the embodiments of the disclosure, the system for controlling computation and the storage medium, the computation resources (for example, processors) may effectively be selected for enabling and/or disabling processing on the basis of a spatial position layout of multiple processors to reduce thermal interaction influence between the computation resources and retard the condition of forcible reduction in performance during conventional heat dissipation management at a high temperature, thereby keeping efficient operation of the system for controlling computation with a multi-processor structure.

The invention claimed is:

1. A method for controlling heat dissipation of a computation resource, comprising:
   determining whether there is a need for enabling or disabling a computer resource on basis of a preset condition;
   when there is a need for enabling a computer resource, determining a computation resource to be enabled according to distances between each computation resource in computation resources in a disabled state and computation resources in an enabled state on the basis of a spatial position layout of computation resources in a current operating state, and enabling the computation resource to be enabled; and
   when there is a need for disabling a computer resource, determining a computation resource to be disabled according to distances between the computation resources in the enabled state on the basis of the spatial position layout of the computation resources in the current operating state, and disabling the computation resource to be disabled.

2. The method according to claim 1, when there is a need for enabling a computer resource, further comprising steps of:
   determining a type of a computation group to which each of the computation resources currently in the enabled state belongs, wherein
   the step of determining a computation resource to be enabled according to the distances between each of the computation resources in the disabled state and the computation resources in the enabled state comprises:
   selecting a computation resource to be enabled from the computation resources in the disabled state in the computation group of the same type according to the distances between each of the computation resources in the disabled state and the computation resources in the enabled state.

3. The method according to claim 1, wherein the step of determining a computation resource to be enabled according to the distances between each of the computation resources in the disabled state and the computation resources in the enabled state comprises:
   determining the distances between each of the computation resources in the disabled state and the computation resources in the enabled state, selecting the computation resources at maximum distances away from each computation resource in the enabled state from the computation resources in the disabled state, and if the computation resources at the maximum distances are the same computation resource, determining the computation resource as the computation resource to be enabled.

4. The method according to claim 3, wherein the step of determining a computation resource to be enabled according to the distances between each of the computation resources in the disabled state and the computation resources in the enabled state further comprises:
   determining the distances between the computation resources in the disabled state and the computation resources in the enabled state, selecting the computation resources at minimum distances away from each computation resource in the enabled state from the computation resources in the disabled state, and if the computation resources at the minimum distances are the same computation resource, excluding the computation resource at the minimum distances when performing selection from the computation resources in the disabled state.

5. The method according to claim 1, wherein, in the method, when there are a plurality of candidate computation resources for the computation resource to be enabled comprises, a candidate computation resource meeting one of a condition that a current temperature is lowest and a condition that a disabled duration is longest is selected as a computation resource to be enabled having a highest enabling priority.

6. The method according to claim 1, wherein the step of determining a computation resource to be disabled according to the distances between the computation resources in the enabled state comprises:
   determining a type of a computation groups to which each of the computation resources currently in the enabled state belongs; and
   when there exist at least two computation resources in the enabled state in the computation group of the same type, determining distances between each of the at least two computation resources and currently operating computation resources in a computation group of another type, determining the computation resource corresponding to minimum distance values, and determining the computation resource as the computation resource to be disabled.

7. The method according to claim 6, wherein the step of determining a computation resource to be disabled according to the distances between the computation resources in the enabled state further comprises:
   when the minimum distance values correspond to a plurality of computation resources, selecting the computation resource adjacent to more computation resources in the enabled state in the group as a computation resource to be disabled with a higher disabling priority according to a distance relationship between the computation resources in the group in the computation group of the same type.

8. The method according to claim 1, wherein the step of determining a computation resource to be disabled according to the distances between the computation resources in the enabled state comprises:
   monitoring one of or a combination of two or more parameters of the a load rate of each computation resource in the enabled state, a service time of the computation resources in the enabled state and operating tasks of the computation resources in the enabled state; and
   when a plurality of computation resources are determined as the computation resource to be disabled according to the distances between the computation resources in the enabled state, selecting the computation resource meeting at least one of a condition that the load rate is lowest, a condition that the load rate is within a preset range, a condition that the service time is longest and a condition that no human-computer interaction processing related operating task is executed as a computation resource to be disabled having a highest disabling priority.

9. The method according to claim 1, when there is a need for disabling a computer resource, further comprising steps of:
determining a type of a computation group to which each of the computation resources currently in the enabled state belongs, wherein
the step of determining a computation resource to be disabled according to the distances between the computation resources in the enabled state comprises:
selecting a computation resource to be disabled from the computation resources in the enabled state according to the distances between the computation resources in the enabled state in the computation group of the same type and computation resources in the enabled state in a computation group of another type, or selecting a computation resource to be disabled from a part of the computation resources in the enabled state, wherein the part of the computation resources in the enabled state is determined in the computation resources in the enabled state on the basis of one of or a combination of two or more of a load rate of each computation resource, service time of the computation resources in the enabled state and operating tasks of the computation resources.

10. The method according to claim 1, wherein the step of determining a computation resource to be enabled according to the distances between each of the computation resources in the disabled state and the computation resources in the enabled state comprises:
selecting the computation resource spaced from each computation resource in the enabled state by at least one computation resource in the disabled state from the computation resources in the disabled state, and determining the computation resource as the computation resource to be enabled.

11. The method according to claim 1, wherein the step of determining a computation resource to be disabled according to the distances between the computation resources in the enabled state comprises:
monitoring one of or a combination of two or more parameters of the a load rate of each computation resource in the enabled state, a service time of the computation resources in the enabled state and operating tasks of the computation resources in the enabled state; and
selecting the computation resource meeting at least one of the condition that the load rate is lowest, the condition that the load rate is within a preset range, the condition that the service time is longest and the condition that no human-computer interaction processing related operating task is executed as the computation resource to be disabled, and when there exist at least two computation resources to be disabled in the computation group of the same type, selecting the computation resource adjacent to more computation resources in the enabled state from the at least two computation resources to be disabled as a computation resource to be disabled having a highest disabling priority.

12. A system for controlling computation, comprising:
a resource monitoring module, configured to determine whether there is a need for enabling or disabling a computer resource on basis of a preset condition; and
a heat dissipation management module, configured to, when there is a need for enabling a computer resource, determine the computation resource to be enabled according to distances between each computation resource in computation resources in a disabled state and computation resources in an enabled state on the basis of a spatial position layout of computation resources in a current operating state and enable the computation resource to be enabled, and further configured to, when there is a need for disabling a computer resource, determine the computation resource to be disabled according to distances between the computation resources in the enabled state on the basis of the spatial position layout of the computation resources in the current operating state and disable the computation resource to be disabled.

13. The system according to claim 12, further comprising:
a first timer, configured to record disabled durations of the computation resources in the disabled state in a disabled mode, and
a thermal sensor, configured to detect current temperatures of the computation resources in the disabled state, wherein
the heat dissipation management module is further configured to, when a plurality of computation resources are determined as the computation resource to be enabled, determine the computation resource meeting one of a conditions that the current temperature is lowest and a condition that the disabled duration is longest as a computation resource to be enabled having a highest enabling priority.

14. The system according to claim 13, further comprising:
a second timer, configured to record service time of the computation resources in the enabled state in an enabled mode,
a load monitor, configured to detect a load rate of each computation resource in the enabled state, and
a task process manager, configured to monitor operating tasks of the computation resources in the enabled state, wherein
the heat dissipation management module is further configured to, when a plurality of computation resources are determined as the computation resource to be disabled according to the distances between the computation resources in the enabled state, select the computation resource meeting at least one of a condition that the load rate is lowest, a condition that the load rate is within a preset range, a condition that the service time is longest and a condition that no human-computer interaction processing related operating task is executed as a computation resource to be disabled having a highest disabling priority, or
the heat dissipation management module is further configured to select the computation resource meeting at least one of the condition that the load rate is lowest, the condition that the load rate is within a preset range, the condition that the service time is longest and the condition that no human-computer interaction processing related operating task is executed as the computation resource to be disabled, and when there exist at least two computation resources to be disabled in a computation group of the same type, select the computation resource adjacent to more computation resources in the enabled state from the at least two computation resources to be disabled as a computation resource to be disabled having a higher disabling priority.

15. The system according to claim 12, further comprising:
a second timer, configured to record service time of the computation resources in the enabled state in an enabled mode,
a load monitor, configured to detect a load rate of each computation resource in the enabled state, and
a task process manager, configured to monitor operating tasks of the computation resources in the enabled state, wherein
the heat dissipation management module is further configured to, when a plurality of computation resources are determined as the computation resource to be disabled according to the distances between the computation resources in the enabled state, select the computation resource meeting at least one of a condition that the load rate is lowest, a condition that the load rate is within a preset range, a condition that the service time is longest and a condition that no human-computer interaction processing related operating task is executed as a computation resource to be disabled having a highest disabling priority, or
the heat dissipation management module is further configured to select the computation resource meeting at least one of the condition that the load rate is lowest, the condition that the load rate is within a preset range, the condition that the service time is longest and the condition that no human-computer interaction processing related operating task is executed as the computation resource to be disabled, and when there exist at least two computation resources to be disabled in a computation group of the same type, select the computation resource adjacent to more computation resources in the enabled state from the at least two computation resources to be disabled as a computation resource to be disabled having a higher disabling priority.

16. A non-transitory computer storage medium having stored therein computer-executable instructions for executing a method for controlling heat dissipation of a computation resource, the method comprising:
determining whether there is a need for enabling or disabling a computer resource on basis of a preset condition;
when there is a need for enabling a computer resource, determining a computation resource to be enabled according to distances between each computation resource in computation resources in a disabled state and computation resources in an enabled state on the basis of a spatial position layout of computation resources in a current operating state, and enabling the computation resource to be enabled; and
when there is a need for disabling a computer resource, determining a computation resource to be disabled according to distances between the computation resources in the enabled state on the basis of the spatial position layout of the computation resources in the current operating state, and disabling the computation resource to be disabled.

17. The non-transitory computer storage medium according to claim 16, when there is a need for enabling a computer resource or when there is a need for disabling a computer resource, further comprising steps of:
determining a type of a computation group to which each of the computation resources currently in the enabled state belongs, wherein
the step of determining a computation resource to be enabled according to the distances between each of the computation resources in the disabled state and the computation resources in the enabled state comprises:
selecting a computation resource to be enabled from the computation resources in the disabled state in the computation group of the same type according to the distances between each of the computation resources in the disabled state and the computation resources in the enabled state, or
the step of determining a computation resource to be disabled according to the distances between the computation resources in the enabled state comprises:
selecting a computation resource to be disabled from the computation resources in the enabled state according to the distances between the computation resources in the enabled state in the computation group of the same type and computation resources in the enabled state in a computation group of another type, or selecting a computation resource to be disabled from a part of the computation resources in the enabled state, wherein the part of the computation resources in the enabled state is determined in the computation resources in the enabled state on the basis of one of or a combination of two or more of a load rate of each computation resource, service time of the computation resources in the enabled state and operating tasks of the computation resources.

18. The non-transitory computer storage medium according to claim 16, wherein the step of determining a computation resource to be enabled according to the distances between each of the computation resources in the disabled state and the computation resources in the enabled state comprises:
determining the distances between each of the computation resources in the disabled state and the computation resources in the enabled state, selecting the computation resources at maximum distances away from each computation resource in the enabled state from the computation resources in the disabled state, and if the computation resources at the maximum distances are the same computation resource, determining the computation resource as the computation resource to be enabled; or
selecting the computation resource spaced from each computation resource in the enabled state by at least one computation resource in the disabled state from the computation resources in the disabled state, and determining the computation resource as the computation resource to be enabled.

19. The non-transitory computer storage medium according to claim 18, wherein the step of determining a computation resource to be enabled according to the distances between each of the computation resources in the disabled state and the computation resources in the enabled state further comprises:
determining the distances between the computation resources in the disabled state and the computation resources in the enabled state, selecting the computation resources at minimum distances away from each computation resource in the enabled state from the computation resources in the disabled state, and if the computation resources at the minimum distances are the same computation resource, excluding the computation resource at the minimum distances when performing selection from the computation resources in the disabled state.

20. The non-transitory computer storage medium according to claim 16, wherein, in the method, when there are a plurality of candidate computation resources for the computation resource to be enabled comprises, a candidate computation resource meeting one of a condition that a current temperature is lowest and a condition that a disabled duration is longest is selected as a computation resource to be enabled having a highest enabling priority.

* * * * *